G. W. SWINBURNE.
APPARATUS FOR PURIFYING SEWAGE OR THE LIKE.
APPLICATION FILED NOV. 16, 1912.
1,153,972.
Patented Sept. 21, 1915.
5 SHEETS—SHEET 1.
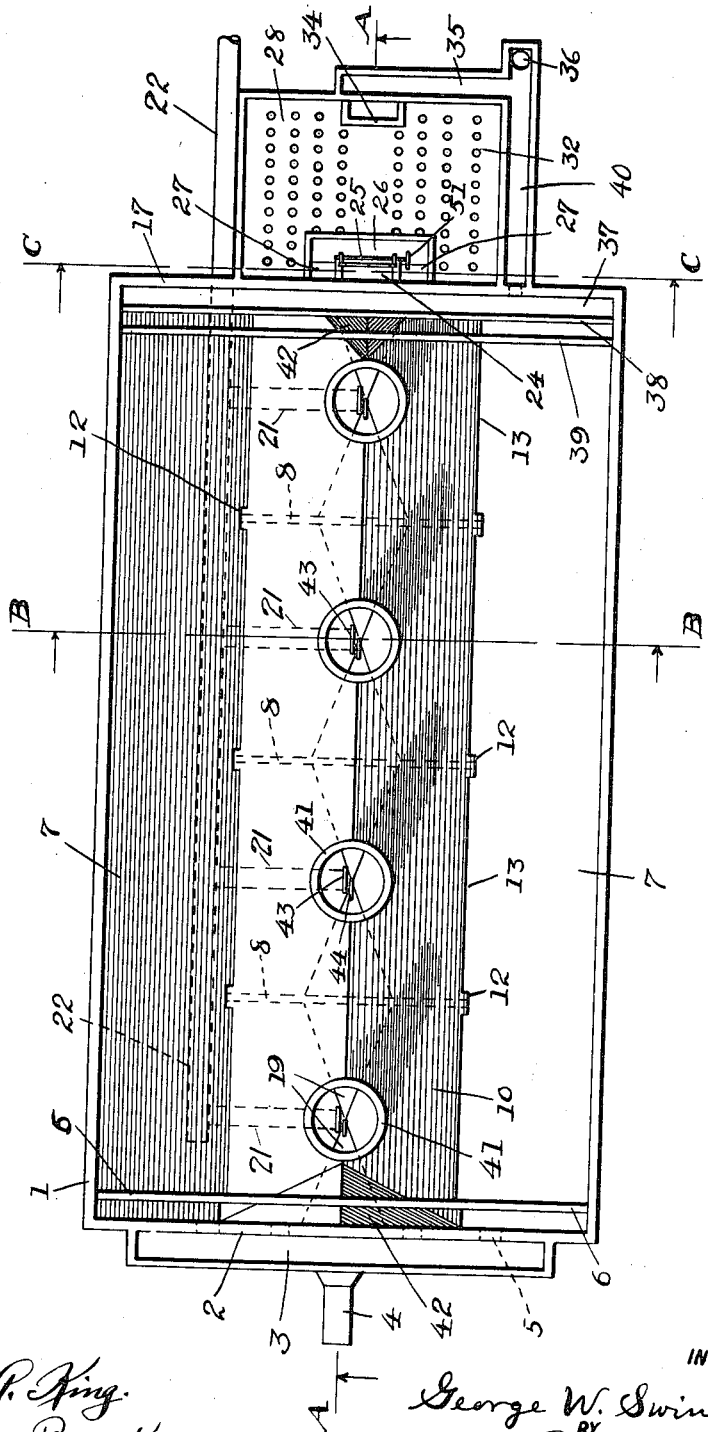

G. W. SWINBURNE.
APPARATUS FOR PURIFYING SEWAGE OR THE LIKE.
APPLICATION FILED NOV. 16, 1912.
1,153,972.
Patented Sept. 21, 1915.
5 SHEETS—SHEET 2.
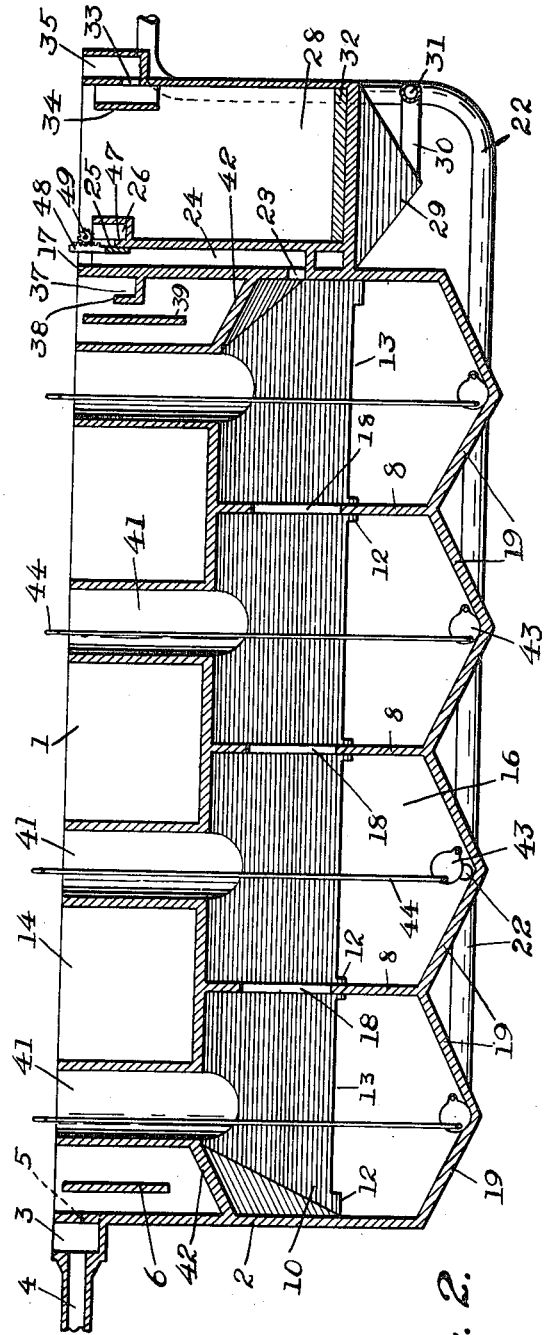
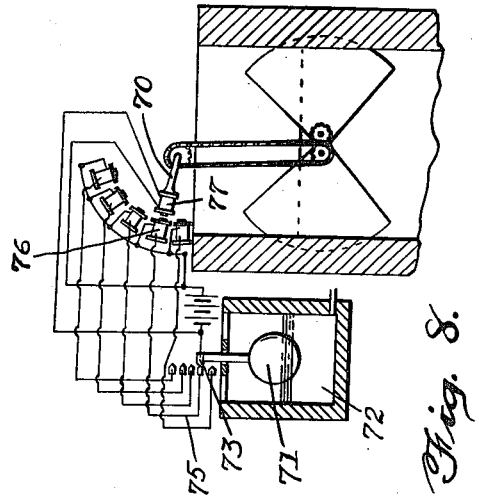
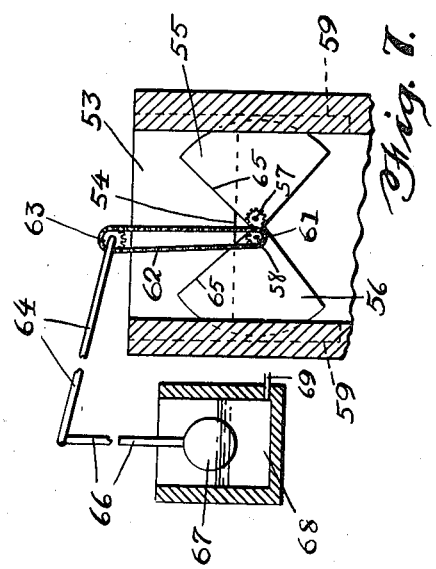
WITNESSES:
Howard R. King
Mildred E. Brooks
INVENTOR:
George W. Swinburne,
BY
Russell M. Everett,
ATTORNEY.

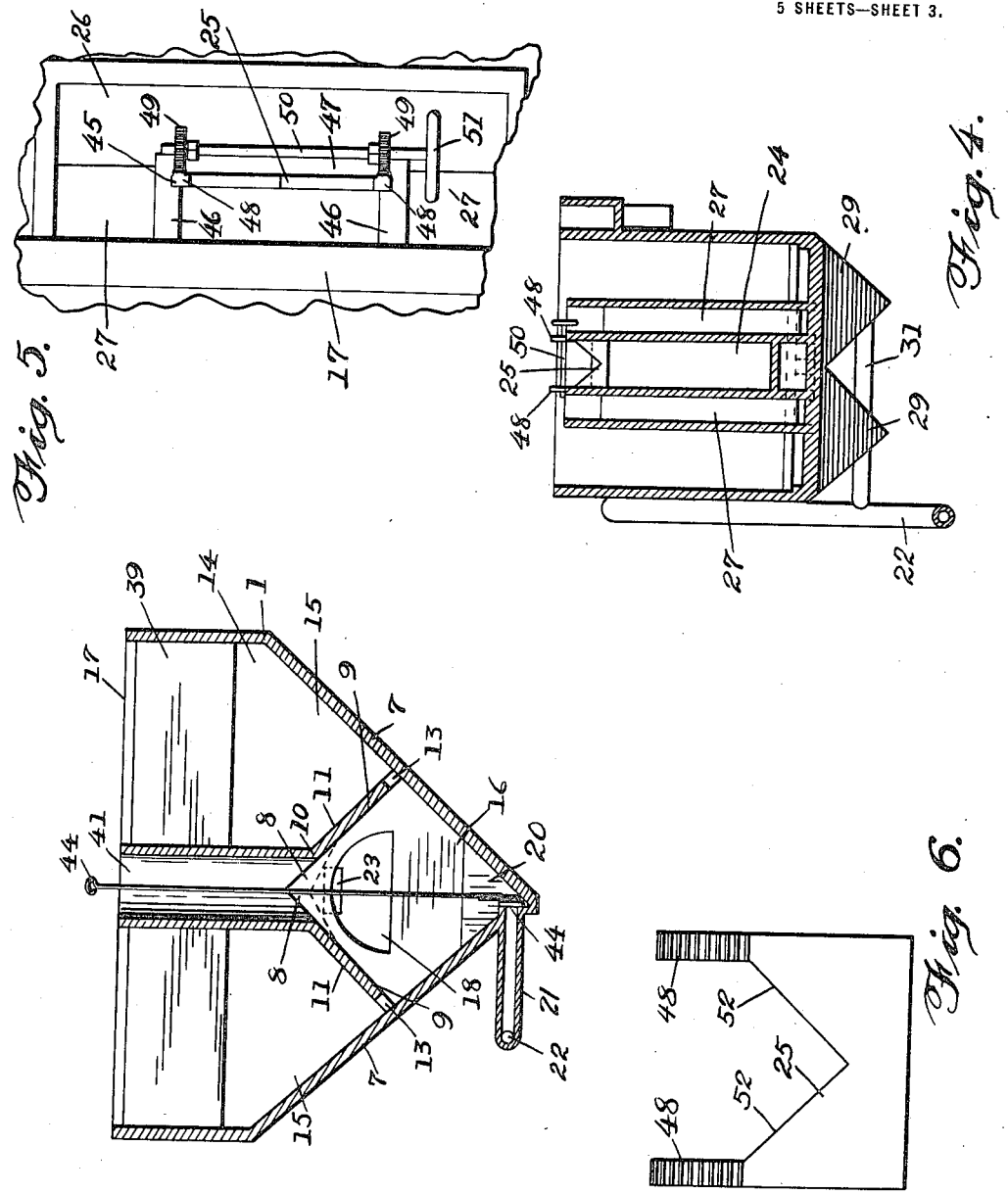

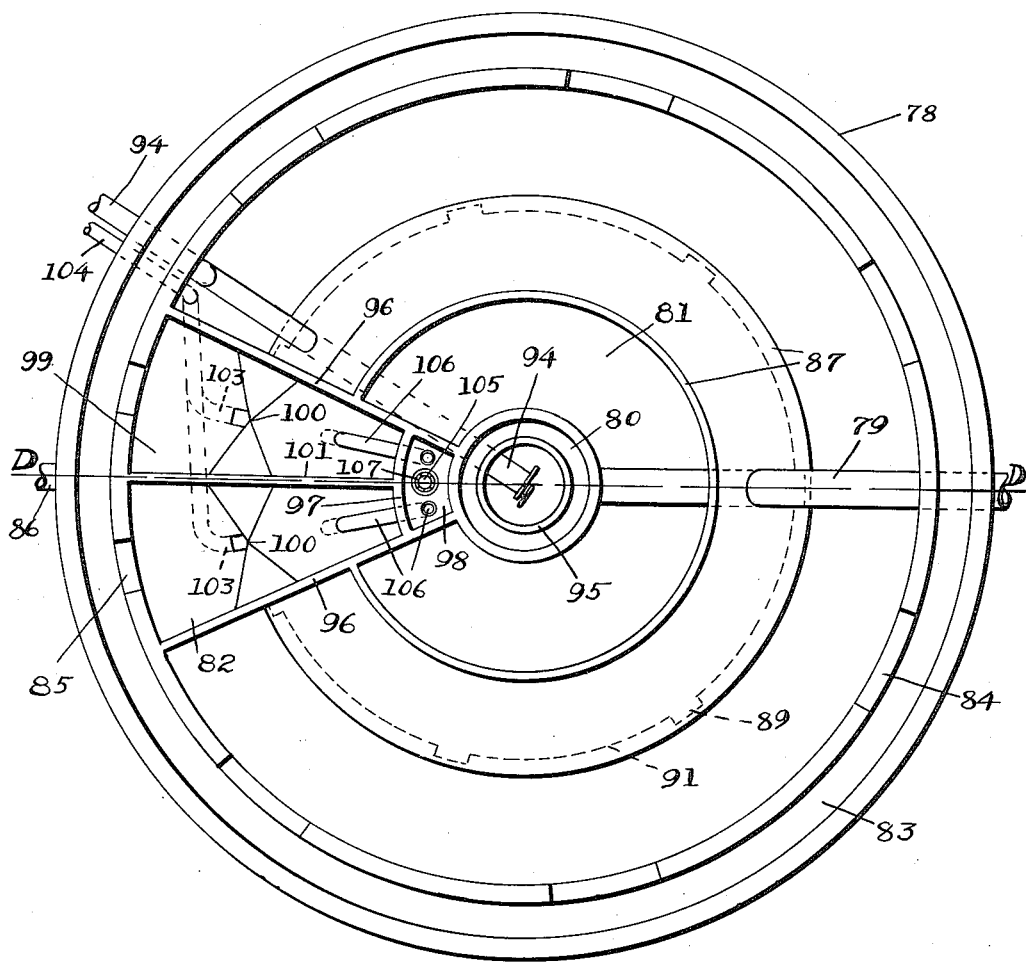

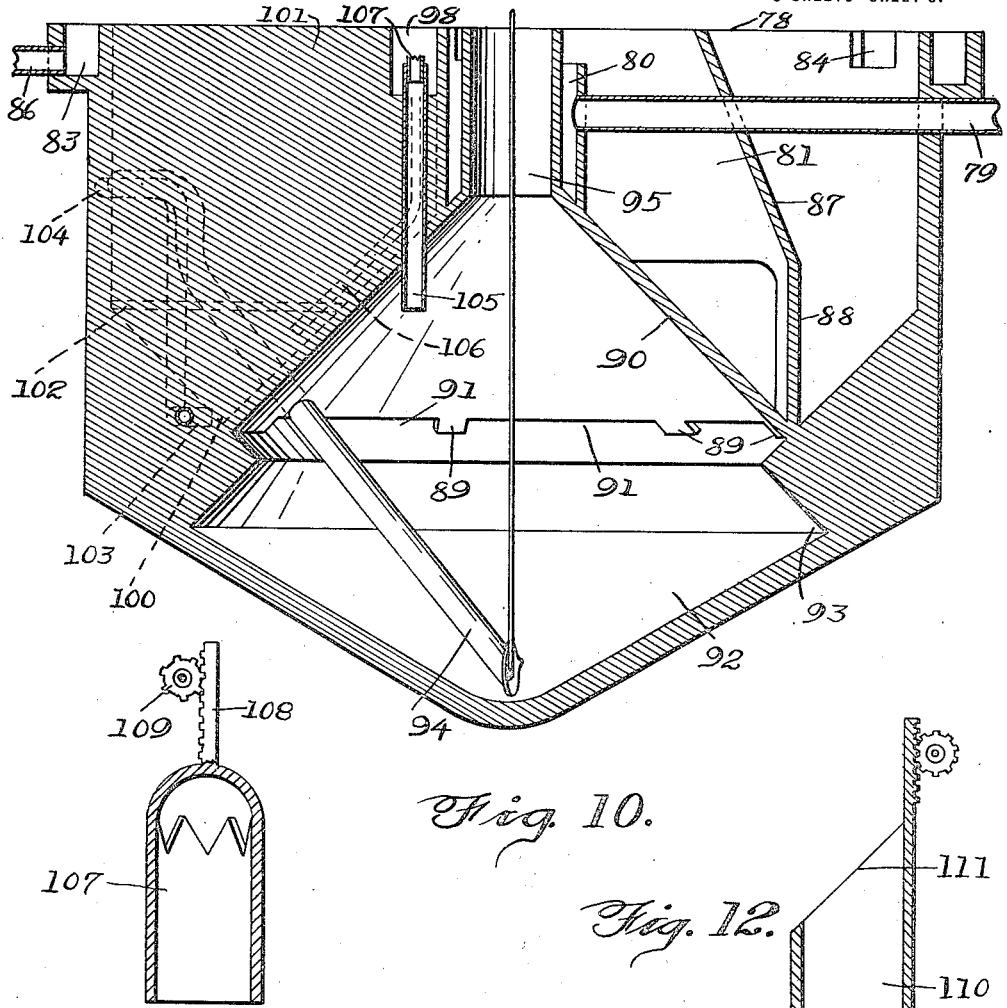
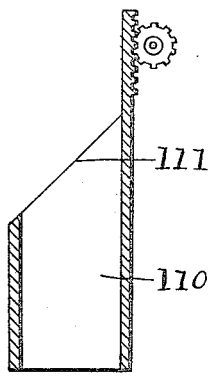
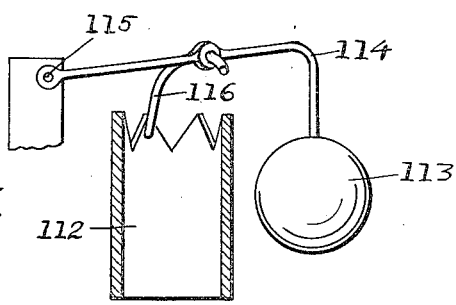

UNITED STATES PATENT OFFICE.

GEORGE W. SWINBURNE, OF EAST ORANGE, NEW JERSEY, ASSIGNOR TO STERILIZATION COMPANY, A CORPORATION OF NEW JERSEY.

APPARATUS FOR PURIFYING SEWAGE OR THE LIKE.

1,153,972.

Specification of Letters Patent. Patented Sept. 21, 1915.

Application filed November 16, 1912. Serial No. 731,700.

*To all whom it may concern:*

Be it known that I, GEORGE W. SWINBURNE, a citizen of the United States, residing at East Orange, in the county of Essex and State of New Jersey, have invented certain Improvements in Apparatus for Purifying Sewage or the like, of which the following is a specification.

It is considered by sanitary engineers that a most important, and generally the first, step in the purification of sewage is the mechanical separation, or sedimentation, of the solids in suspension in the sewage, and that this result can be obtained most rapidly and economically in what are known as two-story sedimentation tanks. In tanks of this type the sewage to be clarified passes through an upper (sedimentation) chamber, or chambers, having sloping bottoms which are so arranged that there is an opening, or slot, at the lowest point for the passage into a lower (reduction) chamber of the solids which are deposited by the flowing sewage. There are two distinct and well-known types of two-story tanks; the "Hampton" or Travis, and the "Emscher" or Imhoff. In the "Emscher" or Imhoff tank, there is no flow of sewage from the upper or sedimentation chamber into the lower or reduction chamber, but gravity is depended upon to cause the solids deposited by the sewage flowing through the upper or sedimentation chamber to pass through the slot into the lower or reduction chamber. In the "Hampton" or Travis tank, a certain predetermined proportion of the sewage entering the upper or sedimentation chamber is caused to flow through the opening or slot at the lowest point of the sedimentation chamber, into the lower or reduction chamber, and after passing through this chamber is discharged at an overflow weir. What the proportion of this flow through the slot or opening between the chambers shall be is determined by the relative width of the overflow weirs of the said chambers, and while this proportion may vary as between any two tanks it has heretofore been predetermined and constant in any given tank. Theoretically and practically the velocity of the sewage passing through the slot to the lower or reduction chamber should be sufficient to prevent the deposit of solids on either the sloping bottom of the upper or sedimentation chamber or at the slot, but not enough to prevent their deposit in the lower or reduction chamber. From the very nature and origin of sewage it follows that it must vary in both volume and composition, not only as between different sewages, but from day to day and even from hour to hour in the same sewage. It will be readily seen from the above that while the proportion of flow through the slot is constant, yet, because of the wide variation in the volume of sewage, the actual quantity passing through the slot, and consequently the velocity, will also vary greatly. It has been impossible heretofore to properly control or regulate the flow through the slot, and one of the objects of my present invention is to provide means for varying such flow at will in a "Hampton" or Travis tank, so that it can be maintained at any desired velocity. The solids which have been separated in the upper or sedimentation chamber, and which are allowed to deposit and accumulate in the lower or reduction chamber, are largely of an organic nature and consequently subject to putrefaction. Such putrefactive action will result in the formation of more or less gas, which, as it rises, will carry with it some of the more finely divided solids. Some of these solids may be carried out with the effluent from the lower or reduction chamber, and if allowed to mingle with the clarified effluent from the upper or sedimentation chamber would lower the character of this effluent.

A further object of my invention, therefore, is to provide means for removing such solids from the effluent of the lower or reduction chamber, so that the effluents from the upper and lower chambers can mingle without lowering the character of the general effluent. Preferably, I employ for this purpose an up-flow filter at the end of the tank and means for conducting the effluent from the lower or reduction chamber through it before said effluent joins the effluent from the upper or sedimentation chamber.

In the "Emscher" or Imhoff type of two-story sedimentation tank, there is no flow of sewage from the upper or sedimentation chamber into the lower or reduction chamber, but the solids deposited by the sewage passing through the upper or sedimentation chamber depend on gravity alone to pass through the slot into the lower or reduction chamber. It has been demonstrated in the operation of tanks of this type that more or less of the deposited solids are retained on the sloping bottom of the upper chamber and that at intervals of from one to two weeks the flow through the upper chamber must be stopped, the accumulation of solids on the sloping bottom of the upper or sedimentation chamber pushed through the slot and time given for these solids to settle before the tank is again put into operation.

It is a still further object of my invention, therefore, to provide an overflow or outlet from the lower or reduction chamber, which can be opened or closed at will, whereby a current from the upper into the lower chamber can be created at the time of cleaning the sloping bottoms of the upper chamber; and to thus require less scraping of those bottoms and to enable the tank to be put into operation as soon as the scraping is completed. It is probable that in the majority of cases it will not be necessary to put the tank out of operation at all, since a slight current into the lower chamber at the time of scraping the bottoms of the upper chamber will eliminate all danger of a return of the solids to the upper chamber. The temporary effluent from the lower chamber created by opening the overflow could be trapped for the elimination of solids in an up-flow filter as already mentioned.

Other objects of the invention are to secure a convenient and suitable construction of such overflow means and filter for the same; to provide a series of sludge pockets, any one of which can be cleaned out or emptied independent of the others; to equalize flow through the longitudinal portions of the sedimentation chamber; to secure a compact and economical construction of the entire tank, and to obtain other advantages and results as may be brought out in the following description.

Referring to the accompanying drawings, in which like numerals of reference indicate the same parts throughout the several views; Figure 1 is a plan of a preferred form of apparatus embodying my invention; Fig. 2 is a central longitudinal section of the same on line A—A Fig. 1; Fig. 3 is a vertical transverse section on line B—B Fig. 1, looking in the direction indicated by the arrow; Fig. 4 is a similar section on line C—C Fig. 1, looking in the direction indicated by the arrow; Fig. 5 is a plan of the adjustable weir and passages controlled by it, on larger scale than in Fig. 1; Fig. 6 is a detail view of the adjustable weir or outlet detached; Figs. 7 and 8 illustrate modified forms of the adjustable weir or outlet; Fig. 9 is a plan of a circular tank or apparatus embodying my invention; Fig. 10 is a central vertical section of the same on line D—D of Fig. 9, and Figs. 11, 12 and 13 illustrate various forms of adjustable weir or outlet for said circular tank.

In said drawings, and referring especially to Figs. 1-6 inclusive, 1 indicates a tank of rectangular form in plan and built of concrete or any other suitable material as is common and well-known in the art. At the upper part of one end wall 2 of the tank, and outside the same, is an influent trough 3 into which the sewage delivery pipe 4 leads and from which trough the sewage passes by openings 5 in said end wall 2 into the tank, where it is deflected downward by a baffle plate 6. The tank has in cross-section a V-shaped bottom, as shown in Fig. 3, the sloping portions 7, 7 of said bottom converging downward at any suitable angle, and at intervals of the length of the tank transverse partitions 8 extend upward from the extreme bottom of the tank, preferably about half-way of the sloping surfaces 7, 7. The upper edges of these partitions 8 are preferably V-shaped so as to provide edges 9, 9 (see Fig. 3) which converge upwardly from the slopes 7, 7 and engage or support an inverted V-shaped diaphragm 10 whose sides 11, 11 slope outward toward the sloping portions 7, 7 of the tank, preferably at substantially the same angle to the vertical as said portions 7, 7. Said sides do not fit tight against the slopes 7, 7, but have long recesses or notches in themselves so as to provide narrow feet 12 to engage said slopes and leave long slots 13 between. It will be understood that the space in the tank above the diaphragm 10 forms a sedimentation chamber 14 with two similar portions 15, 15 extending longitudinally of the tank one on each side of the ridge of the diaphragm 10, and the space below said diaphragm 10 constitutes a reduction chamber 16 which receives through the slots 13 the solid matter deposited in the sedimentation chamber. The greater proportion of the flow of sewage is through the sedimentation chamber and out at the opposite end 17 of the tank from the inflow end 2, but there is a divisional flow down through the slots 13 to sweep the sediment into the reduction chamber, and consequently a flow through said reduction chamber, which however is much slower than the flow in the sedimentation chamber. The partitions 8 are of course provided with suitable openings 18 to enable this flow to take place, it being understood that the purpose of said partitions is chiefly to separate the sludge pockets and support the diaphragm 10. In each of the compartments of the reduction chamber 16 formed by the partitions 8 the ends of the V-shaped floor are filled by triangular pieces 19 so as to form flat surfaces sloping toward the center of the compartment bottom as do also the side walls. This provides a series of inverted pyramidal pockets 20 for the sediment to collect in as sludge, and a pipe 21 leads from the lowest point of each pocket to a sludge main 22 through which the sludge can be drawn off from the entire tank. The effluent from the reduction chamber 16 escapes through an outlet 23 in the end wall 17 of the tank, just beneath the diaphragm 10, and is conducted upward through a passage 24 outside the said end wall 17 to escape over a weir 25, at about the water level of the contents of the tank, into a basin 26 from which passages 27, 27 extend downward at opposite sides of the passage 24 to the lower part of an upflow filter 28 preferably arranged at the end of the tank 1, as shown. This filter comprises two funnel-shaped pockets 29, 29 at its bottom, into the top of each of which opens one of the downflow passages 27, 27 and each of which pockets has a sludge discharge pipe 30 leading to a branch 31 of the sludge main 22. A perforated plate 32 forms a support above said sludge pockets 29 for broken stone or the like through which the effluent must rise to remove fine suspended solids therefrom. A discharge opening 33 is provided at the top of the filter in its side away from the tank, surrounded by a baffle 34, and said outlet 33 opens into a discharge duct 35 leading to a main effluent discharge 36. Across the tank 1, inside the same and near the upper part of its end wall 17 at the outlet end, is a trough 37 whose inner wall 38 forms a weir over which the effluent from the sedimentation chamber 14 flows, a baffle plate 39 being preferably arranged adjacent to said weir 38. From said trough 37 an opening in the end wall 17 leads to a duct 40 which joins the filter outlet duct 35 and so leads to the main effluent discharge 36. Manholes 41 are shown leading upward from the top of the diaphragm 10 to points above the surface of the contents of the tank, although access to the reduction chamber may be had by any other suitable and well-known means. The diaphragm 10 is also preferably sloped downward at its extreme ends, adjacent to the end walls 2, 17 of the tank, as indicated at 42, 42, so as to provide free communication between the two parallel portions 15, 15 of the sedimentation chamber and at the same time avoid any possible corners for catching and retaining gases or the like from beneath or deposits of solid matter from above. Also the outlet from the bottom of each sludge pocket 20 preferably has a valve 43 operated by a handle or stem 44, extending up through the manhole 41 directly above it, as shown.

It will be understood that in operation sewage flows into the tank through the openings 5 and that a portion of this flow continues through the sedimentation chamber toward the opposite end of the tank, the effluent escaping over weir 38 through trough 37 and duct 40 to the main discharge 36. Solids are deposited from the sewage flowing through said sedimentation chamber, by gravity, upon the sloping bottom surfaces 7 and 11 and are carried down through the slots 13 by the flow therethrough into the reduction chamber 14 from which the solids collect in the sludge pockets 20 and the effluent escapes by the outlet 23, up-passage 24, basin 26 and down-passages 27, 27, to the filter 28. As has been already explained, it is desired to so adjust and regulate the divisional flow through the reduction chamber 14 as to sweep the solids settling in the sedimentation chamber through the slots 13 and at the same time to have said flow of no greater force than required for that purpose. This requires means for varying said flow to suit different conditions at different times, and I furnish such means by making the weir 25 at the top of the upward passage 24 of the tank adjustable, so as to vary the flow over or past it. In the simple form in which this is shown in Figs. 1–6 of the drawings, the weir 25 slides up and down in suitable ways 45, 45 upon the sides 46 of the passage, lying flat against the outer side wall 47 of the passage, which projects preferably a little above the floor of the basin or receiving end 26 of the down-flow passages 27, 26 to the filter. The adjustable weir 25 has in its upper edge a V-shaped cut or recess, and at its opposite upright edges has upwardly projecting arms 48, 48 with racks secured thereon and engaged by pinions 49, 49 upon a shaft 50 mounted in suitable bearings upon the tank and adapted to be turned by a hand wheel 51 or the like. It will be understood that as the weir 25 is raised so as to lessen the length of the portion of the upper edge of the side wall 47 of the passage 24 which is between the converging edges 52, 52 of said weir, the flow of effluent will be decreased and consequently the flow from the sedimentation chamber into the reduction chamber will be decreased, whereas if the adjustable weir 25 is lowered the outflow of effluent will be increased and the flow through the slots 13 correspondingly increased. The flow from the sedimentation chamber to the reduction chamber can thus be regulated easily and exactly. Under some conditions it may be desired to make this regulation of the divisional flow automatic, and I have illustrated in Figs. 7 and 8 constructions adapted to this end.

In Fig. 7, 53 indicates the up-flow passage of a tank having the upper edge of its wall 54 over which flow is to take place controlled by wing-like weir-sections 55, 56, pivoted as at 57, 58 respectively to swing vertically edgewise and working at their outer ends in slots 59 in the side-walls of the passage 53. Gears pivoted upon the same centers as the wings 55, 56 and fast with respect thereto, intermesh with each other, and one of said gears has axially coincident with itself and rotatably fast with respect to itself a sprocket 61 around which extends a chain 62; this chain at any upper convenient point passes over a second sprocket wheel 63, having a radial arm 64, so that by swinging this arm the weir-sections 55, 56 can be moved together or apart at their upper diverging edges 65, 65. To move said arm 64 up and down, I have shown it connected to the stem 66 of a float 67 arranged in a chamber 68 which may be connected by a small passage 69 with the outflow of effluent from the sedimentation chamber of the tank. Of course the float 67 could, if desired, be placed directly in the outflow, but the arrangement of it in a chamber 68 connected by a small passage 69 protects it against sudden and violent fluctuations, as will be understood. The arrangement and connections are such that when the float 67 rises, the weir-sections 65, 66 approach at their upper edges 65, 65 and thus reduce the weir passage, and on the other hand as the float 67 lowers said weir-sections separate at their upper edges and enlarge the outlet.

In Fig. 8 I have shown a construction of weir-sections, pinions, sprocket wheels and chain the same as in Fig. 7 and already described, but I have shown the controlling arm 70 adapted to be operated electrically as connections are made by a float 71 in a chamber 72 which may be connected to the outflow of effluent from the sedimentation chamber of a tank as described in connection with Fig. 7. A terminal 73 carried by the float stem is adapted to contact with the various terminals of a series and thus energize the corresponding magnets of a series of magnets arranged in a circular arc and adapted to move the said arm 70. For example, as shown in the drawing the float terminal 73 is in contact with the series terminal 74 and is thus energizing through connection 75 the magnet 76 so as to hold the lever 70 in the position as shown. For greater effectiveness the said lever also carries a magnet 77 which is always energized by connections separate from those of the series of magnets already described. This construction is shown as typical of means for introducing a force stronger than the buoyancy of the float 71 to operate the weir-sections.

While I have thus far shown and described my improved tank as rectangular in plan, I desire to be understood that it may be of any shape desired, and for better illustration of this, I have in Figs. 9 and 10 shown a circular tank 78. Here 79 is the inlet end of a sewage pipe discharging into an annular trough 80 at the center of the tank and from which the sewage overflows into a sedimentation chamber 81 which is annular except for a segmental portion which is occupied by a filter 82. Outside its upper edge the tank has a trough 83 into which the effluent escapes by openings 84 from the sedimentation chamber and by openings 85 from the filter 82, and which trough conducts both effluents to the main discharge 86. As the sewage enters the sedimentation chamber 81 it is prevented from flowing directly to the outlets 84 by an annular baffle plate 87 which extends down into the tank sufficiently far for the purpose and is supported by legs 88 which preferably coincide in position with the feet 89 of the diaphragm 90 hereinafter described. The bottom of the tank is conical, and the diaphragm 90 flares conically outward from the bottom of the central trough 80 to meet the sloping walls of the tank bottom intermediate of their upper edge and apex, as shown, engaging the same by feet 89 so as to provide long slots 91 through which solids deposited in the sedimentation chamber may pass to the reduction chamber 92 beneath said diaphragm 90. Preferably the wall of said reduction chamber 92 is offset outwardly a little distance below the diaphragm 90, as at 93, so as to facilitate collection of sludge in the bottom of the reduction chamber, and from the extreme bottom of said chamber leads a tube 94 for removing the sludge. Preferably a tubular manhole 95 arranged centrally of the annular intake trough 80 provides access to the top of the reduction chamber 92. The filter 80 is partitioned off from the sedimentation chamber by radial partitions 96, 96 extending from the intake trough 80 to the outer wall of the tank, the inner end of said space being divided off from the rest of the filter by a curved partition 97 and filled up at its lower part so as to form a basin 98 at the upper level of the tank. The main filter chamber 99 has at its bottom two funnel-shaped sludge pockets 100, 100 with a partition 101 between upon which rests a removable supporting plate 102 for broken stone or other filtering material. From the bottoms of said sludge pockets branches 103, 103 lead to a pipe 104 through which the sludge pipe 94 from the reduction chamber. shown leaving the tank adjacent to the sludge pipe 94 from the reduction chamber. From the upper part of the reduction chamber a tubular passage 105 leads upward into the regulating basin 98 between the filter 82 and intake trough 80, the end of said tubular passage preferably projecting above the floor of the basin; the effluent from the reduction chamber thus escapes into said basin 98 and is conducted from thence to the filter 82 by tubes 106, 106 leading downward and opening into the upper parts of the pockets 100, 100 beneath the filter plate 102. It is at the top of the tube 105 entering the regulating basin 96 that I provide means for regulating the flow from the sedimentation chamber into the reduction chamber, and in Figs. 9 and 10 I have shown said regulating means comprising a tubular weir or sleeve 107 with V-shaped notches in its upper edge adapted to be telescopically raised and lowered with respect to the tube 105. Said sleeve may support itself frictionally on the tube 105 and be shifted longitudinally with respect thereto either by gentle blows, or by a rack 108 and pinion 109 as shown in Fig. 11, or by any other suitable means.

In Fig. 12 I have shown a sleeve weir 110 with its end beveled or cut on a slant, as at 111, and in Fig. 13 I have shown a sleeve 112 of the type shown in Fig. 11 adapted to be raised and lowered by a float 113 having its stem 114 fulcrumed at its extremity, as at 115, and pivoted intermediate of its ends to the bail 116 of said sleeve, so that as the float rises and falls the tubular weir will be raised and lowered.

While I have shown in both the rectangular and the circular forms of tank a double up-flow filter, or one having two sludge pockets, it will be understood that such a filter with only one pocket can be used, or a different kind of filter altogether. Furthermore, the adjustable weir for regulating flow from the sedimentation chamber to the reduction chamber may be located at any point where it will accomplish that purpose, or any other regulating means adapted for the same purpose can be used and located wherever desired. I prefer the adjustable weir, as shown and described, and I have placed it back of the filter so as to control the single stream of effluent before it divides to enter the filter, but neither the weir shown nor its particular location is essential, and I desire to be understood as covering the use of any means whatever for regulating the divisional flow through the reduction chamber, or flow from the sedimentation chamber to the reduction chamber, so as to vary its ratio to the main flow directly through the sedimentation chamber.

It will be noted that the flow from the upper sedimentation chamber to the lower reduction chamber is a forced circulation produced by artificial means as distinguished from the natural down-flow of sludge, such as is common in the "Hampton" or Travis tanks well-known to the art and illustrated for example in United States Patent No. 1,076,721 of October 28, 1913.

Having thus described the invention, what I claim as new is:

1. The combination of a reservoir having an upper sedimentation chamber and a lower reduction chamber communicating with each other, means for supplying sewage to the sedimentation chamber, means for discharging sludge from the reduction chamber, means for discharging effluent from each of said chambers independent of the other and of said sludge discharge means, and means for varying the ratio between said effluent discharges from the chambers.

2. The combination of a reservoir having an upper sedimentation chamber and a lower reduction chamber communicating with each other, means for supplying sewage to the sedimentation chamber, means for discharging sludge from the reduction chamber, means for causing an artificial circulation from the upper chamber to the lower one, and means for varying said artificial circulation.

3. The combination of a reservoir having an upper sedimentation chamber and a lower reduction chamber communicating with each other, means for supplying sewage to the sedimentation chamber, means for discharging sludge from the reduction chamber, means for discharging effluent from each of said chambers independent of the other and of said sludge discharge means, and an adjustable weir for varying the ratio between said effluent discharges from the chambers.

4. The combination of a reservoir having an upper sedimentation chamber and a lower reduction chamber communicating with each other, means for supplying sewage to the sedimentation chamber, means for discharging sludge from the reduction chamber, means for discharging effluent from said sedimentation chamber independent of the said reduction chamber, effluent discharge means leading from the reduction chamber independent of the said sedimentation chamber and the said sludge discharge means to substantially the level of the sedimentation chamber, and means at said level for varying the ratio between the volumes of said effluent discharges from the chambers.

5. The combination of a reservoir having an upper sedimentation chamber and a lower reduction chamber communicating with each other, means for supplying sewage to the sedimentation chamber, means for discharging sludge from the reduction chamber, an outlet weir for said sedimentation chamber, effluent discharge means leading from the reduction chamber independent of the said sedimentation chamber and the said sludge discharge means, a weir in said reduction chamber effluent discharge means at substantially the same level as the outlet weir of the sedimentation chamber, and means for adjusting one of said weirs to vary the ratio between the volumes of said effluent discharges from the chambers.

6. The combination of a reservoir having an upper sedimentation chamber and a lower reduction chamber communicating with each other, means for supplying sewage to the sedimentation chamber, means for discharging sludge from the reduction chamber, means for causing an artificial flow from said sedimentation chamber through the reduction chamber, means for discharging effluent from each of said chambers independent of the other and of said sludge discharge means, and means for regulating flow through the reduction chamber.

7. The combination of a reservoir having an upper sedimentation chamber and a lower reduction chamber communicating with each other, means for supplying sewage to the sedimentation chamber, means for discharging sludge from the reduction chamber, separate effluent discharges for said chambers each independent of the other chamber and of said sludge discharge means, and means for varying the capacity of the effluent discharge of the reduction chamber.

8. The combination of a reservoir having an upper sedimentation chamber and a lower reduction chamber communicating with each other, means for supplying sewage to the sedimentation chamber, means for discharging sludge from the reduction chamber, means for discharging effluent from each of said chambers independent of the other and of said sludge discharge means, and means for regulating the discharge of effluent from the reduction chamber.

9. The combination of a reservoir having an upper sedimentation chamber and a lower reduction chamber communicating with each other, means for supplying sewage to the sedimentation chamber, means for discharging sludge from the reduction chamber, effluent discharge means leading from the top of the sedimentation chamber, effluent discharge means leading from the reduction chamber independent of the said sedimentation chamber and the said sludge discharge means to substantially the level of the sedimentation chamber, and means at said level for varying the volume of flow through said reduction chamber effluent discharge means.

10. The combination of a reservoir having an upper sedimentation chamber and a lower reduction chamber communicating with each other, means for supplying sewage to the sedimentation chamber, means for discharging sludge from the reduction chamber, an outlet weir for said sedimentation chamber, effluent discharge means leading from the reduction chamber independent of the said sedimentation chamber and the said sludge discharge means, and an adjustable weir in said reduction chamber effluent discharge means at substantially the same level as the outlet weir of the sedimentation chamber.

11. The combination of a reservoir having an upper sedimentation chamber and a lower reduction chamber communicating with each other, means for supplying sewage to the sedimentation chamber, means for discharging sludge from the reduction chamber, an outlet weir for said sedimentation chamber, effluent discharge means leading from the reduction chamber independent of the sedimentation chamber and of said sludge discharge means, a weir in said reduction chamber effluent discharge means at substantially the same level as the outlet weir of the sedimentation chamber, and means for adjusting said weir to regulate the flow from the reduction chamber.

12. The combination of a reservoir having an upper sedimentation chamber and a lower reduction chamber communicating with each other, means for supplying sewage to the sedimentation chamber, an outlet weir for said sedimentation chamber, discharge means leading from the reduction chamber, an adjustable weir in said discharge means at substantially the same level as the outlet weir of the sedimentation chamber, and means adapted to be actuated by the outflow from the sedimentation chamber for automatically adjusting said weir.

13. The combination of a reservoir having an upper sedimentation chamber and a lower reduction chamber communicating with each other, means for supplying sewage to the sedimentation chamber, an outlet weir for said sedimentation chamber, discharge means leading from the reduction chamber, an adjustable weir in said discharge means at substantially the same level as the outlet weir of the sedimentation chamber, a float adapted to be raised and lowered by the outflow from the sedimentation chamber, and means for operating the said adjustable weir adapted to be actuated by said float.

14. The combination of a reservoir having an upper sedimentation chamber and a lower reduction chamber communicating with each other, means for supplying sewage to the sedimentation chamber, an outlet weir for said sedimentation chamber, a filter having an inlet, discharge means leading from the reduction chamber to said filter inlet, and an adjustable weir at the junction of said discharge means and inlet.

15. The combination of a reservoir having an upper sedimentation chamber and a lower reduction chamber communicating with each other, means for supplying sewage to the sedimentation chamber, an outlet weir for said sedimentation chamber, an upflow filter having an inlet leading downward from its top, discharge means leading from the reduction chamber upward at the side of said filter inlet, and an adjustable weir between the upper ends of said discharge means and inlet.

16. The combination of a reservoir having an upper sedimentation chamber and a lower reduction chamber communicating with each other, means for supplying sewage to the sedimentation chamber, an outlet weir for said sedimentation chamber, a controlling basin at substantially the same level as the outlet weir of the sedimentation chamber, a filter having an inlet leading from said controlling basin, discharge means leading from the reduction chamber to said controlling basin, and an adjustable weir in said controlling basin.

17. The combination of a reservoir having an upper sedimentation chamber and a lower reduction chamber providing at its bottom a series of sludge pockets, means for supplying sewage to the sedimentation chamber, separate effluent discharges for said chambers each independent of the other chamber and means for drawing sludge from each sludge pocket independent of the others.

18. The combination of a reservoir having intermediate of its top and bottom a diaphragm with slots at its opposite edges adjacent the side walls of the reservoir and having its ridge depressed adjacent the end walls of the reservoir, means for supplying sewage to the reservoir above said diaphragm, and separate effluent discharges for the reservoir above and below said diaphragm.

19. The combination of a reservoir having an upper sedimentation chamber and a lower reduction chamber communicating with each other, means for supplying sewage to the sedimentation chamber, a filter, means for conducting effluent from the reduction chamber to said filter, and a main effluent discharge having branches leading from said filter and the sedimentation chamber of the reservoir.

GEORGE W. SWINBURNE.

Witnesses:
RUSSELL M. EVERETT,
HOWARD P. KING.